April 14, 1942.                T. E. ALDHAM                2,280,033
                          FILTER CARTRIDGE MOUNTING
                            Filed July 20, 1939
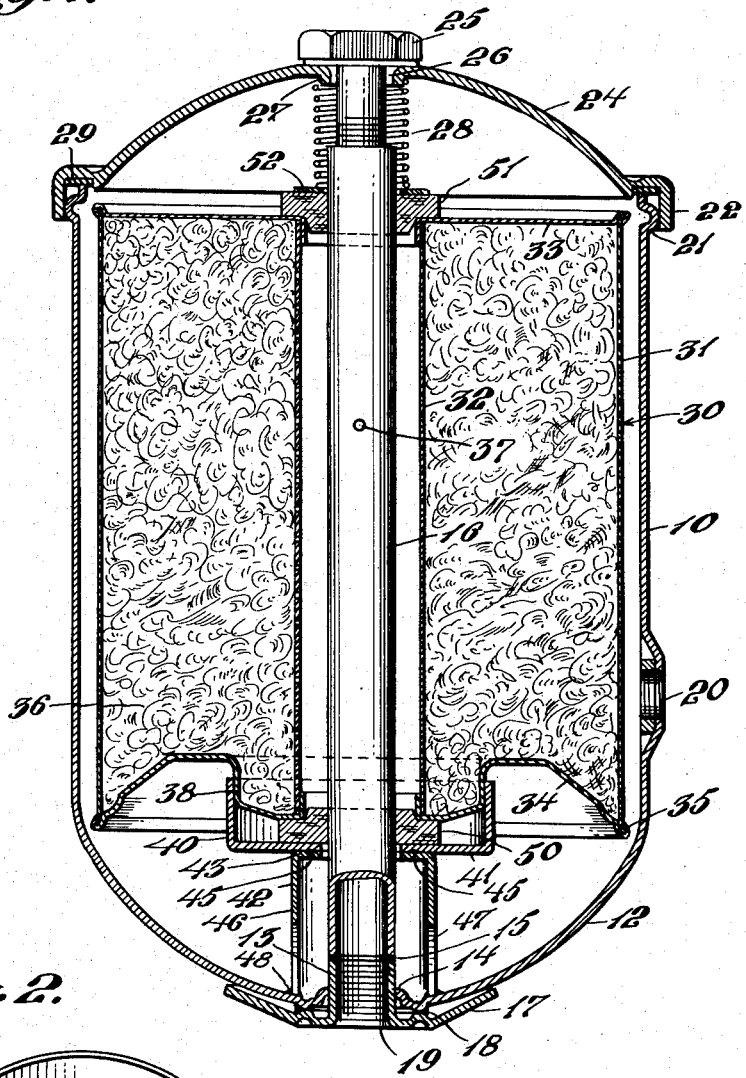
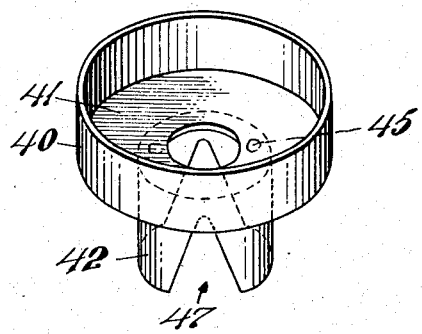
INVENTOR.
Thomas E. Aldham
BY Barlow & Barlow
ATTORNEYS.

Patented Apr. 14, 1942

2,280,033

UNITED STATES PATENT OFFICE 2,280,033

FILTER CARTRIDGE MOUNTING

Thomas E. Aldham, Providence, R. I., assignor to Fram Corporation, a corporation of Rhode Island Application July 20, 1939, Serial No. 285,473

5 Claims. (Cl. 210—62)

This invention relates to oil filters, and in particular to improvements in oil filters of the type for the filtration of oil in the pressure lubricating systems of internal combustion engines; and has for one of its objects the centering of a removable filter cartridge into proper operating position easily and quickly when the same is inserted as a unit into the casing.

Another object of the invention is the provision of means which will be highly effective for insuring the retention of the filter cartridge unit in correct position for operation when properly assembled within the casing.

Another object is to provide a filter cartridge centering and retaining device of simple and relatively inexpensive construction for both centering the filter cartridge unit at the time of insertion within the casing and for supporting and maintaining the filter cartridge unit, in correct operating position, and to prevent slippage about the connection of the filter cartridge unit with the device which may occur in use of the filter.

With these and other objects in view, the invention consists of certain novel features of construction, as will be more fully described, and particularly pointed out in the appended claims.

In the accompanying drawing:

Fig. 1 is a central longitudinal sectional view showing one form of construction in accordance with the invention; and Fig. 2 is an enlarged perspective view of the seating member shown in Fig. 1.

In the operation of internal combustion engines, particularly the engine of a motor vehicle, it is common practice to employ oil filters in connection with the lubricating system to remove the particles of carbon or other foreign matter from the lubricating oil supplied to the bearings. One common construction of such an oil filter has employed a removable filter cartridge within a casing and having a central opening loosely fitting over a central tubular perforated discharge member, which casing is permanently connected in the oil line at all times while there is provided compressible washers on the tubular member at the ends of the central cartridge opening for sealing the same, and a coiled spring for holding the cartridge from rattling and properly seated on the bottom washer to cause the oil to follow the desired path of travel through the cartridge when all the parts are assembled in operative relation, and also a removable cover which is secured in proper seating position by a clamp or by being bolted to the casing. In such prior construction, however, the filter cartridge at times becomes unseated or displaced sidewise with respect to the washers, due to the motion of the vehicle, and will not insure the proper path of flow of the oil through the filter cartridge from the outside toward the center but instead permits the oil to be bypassed around the filtering material thus making the operation of the filter uncertain and at times unreliable; and in order to overcome these above named difficulties I have provided means fixed within the casing coacting with a portion of the filter cartridge for centrally positioning the same in proper operative relation with respect to the casing and also for supporting and holding the cartridge in place during use of the filter and at the same time effecting a seal with the cartridge opening, the arrangement being such that the cartridge may be readily and easily removed when replacement or cleaning of the same is desired; and the following is a more detailed description of the present embodiment of this invention, illustrating the preferred means by which these advantageous results may be accomplished:

With reference to the drawing 10 designates a metal casing of generally cylindrical form having an integral end wall 12 which is suitably shaped to provide a bottom bulging downwardly from the sides and of generally rounded contour. A tubular outlet fitting 13 is shown as extending inwardly of the casing through a central opening 14 in its bottom wall 12, the inner end face of the fitting 13 being butt welded as indicated at 15 to the bottom end of the usual tubular perforated discharge member 16 disposed centrally and extending longitudinally of the casing. An annular flange 17 integral with the outer end of the tubular outlet member 13 and fixedly secured to the outside of the bottom wall 12 of the casing by means of an annular layer 18 of welding material which serves to retain the discharge member 16 in a centrally disposed position within the casing. The outer end portion of the bore of the tubular outlet member 13 is internally threaded as indicated at 19 for attachment of a suitable fitting (not shown) to allow the exit of the filtered oil. The specific form of the flange 17 illustrated in the drawing as well as the particular construction shown therein of the bottom wall 12 of the casing forms "per se" no part of the present invention, as such structure forms the subject matter of separate application and is described and claimed in the copending application of Wilkinson for filter casing, filed on even date herewith. The casing also is provided with an internally threaded inlet opening 20 in a portion of the side wall of the casing intermediate of its ends for connection of a suitable fitting (not shown) to allow the inlet of the oil to be filtered.

The other end of the casing 12 is open and there is provided on the outside of the casing adjacent its open end, an annular beading 21 formed by expanding outwardly the portion of the side walls of the casing at such location. This beading 21 engages the inside periphery of the annular flanged rim 22 of the cover 24 and is tightly gripped by the rim which is forced over the beading 21 when the cover is drawn down into its closed position upon tightening of the bolt 25 which passes through the central opening 26 of the cover and has screw threaded engagement within the discharge tube 16. The specific structure of the beading 21 shown in the drawing forms "per se" no feature of the present invention since such structure is described and claimed in another application of Wilkinson for oil filter casing filed on even date herewith.

As shown in Fig. 1, the cover 24 is arched upwardly and the central opening 26 thereof forms the bore of an inwardly deflected sleeve-like projection 27 over the outside of which is fitted one end of a coiled spring 28. Between the cover 24 and the end face of the open end of the casing 10 there is provided an annular gasket 29 against which pressure is applied for sealing the cover in its closed position when the cover is drawn down tightly by the bolt 25.

Disposed within the casing 10 and removable therefrom when the cover 24 is removed is the filter member or cartridge which is generally designated 30 and consists of a cylindrical metal container having two concentric perforated cylindrical walls 31 and 32 capped at their ends by the annular imperforate end members or heads 33 and 34, the outer edges of which are flanged over as at 35 so as to surround the ends of the outer cylindrical wall 31. The space within the cartridge between the cylindrical walls 31 and 32, and the end discs 33 and 34 is filled with suitable filtering material 36. The portion of the tube 16 between the end discs 33 and 34 is provided with diametrically opposed openings or perforations 37 to enable the oil which has filtered through the filtering material 36 to enter and escape through the center tube.

To properly center the filter cartridge 30 with respect to the casing 10 and to insure it against lateral movement so that it will not become unseated when is use and result in by-passing oil directly from the cavity of the casing into the outlet member, I form the bottom disc 34 of the filter cartridge 30 with an enlarged hollow downwardly extending annular boss 38 the outside diameter of which is such as to be received within and snugly fit into the open upper end of a cylindrical cup member 40 upstanding from the bottom wall of the casing. The cup member 40 has an annular end wall 41 through which the lower end portion of the central tubular discharge member 16 extends and is supported at a substantial height above the inside surface of the bottom wall 12 by means of a thimble 42 provided with an annular upper end wall 43 through which the tubular member 16 passes, the annular end walls 41 and 43 of the cup member and the thimble respectively being integrally united together in back to back relationship in any suitable manner, as by being spot welded as indicated in the drawing by the weld portions 45. The downwardly extending side walls 46 of the thimble are formed at their free end portions with a pair of diametrically opposed openings 47 which extend longitudinally inwardly from the bottom edge of the thimble for circulation of the oil in the cavity of the casing. The thimble is rigidly secured to the bottom of the casing by welding the bottom edges of the thimble thereto, as indicated at 48 in Fig. 1.

The cartridge is sealed by a washer 50 formed of cork or other suitable material which rests upon the bottom wall 41 of the cup 40 and snugly embraces the central discharge tube 16, while it engages the edge of bottom opening of the central tube 16, as illustrated in Fig. 1, for sealing the lower end of the central opening of the cartridge. At the upper end of the filter there is provided a similar cork washer 51 which snugly embraces the tube 16 and engages the edge of the upper end opening of the centrally extending outlet opening of the cartridge for sealing the same when the spring 28 which encircles the tube 16 bears down upon the washer 52 to press the cork washer 51 firmly in engagement with the tube 16 and such edge of the central discharge opening of the cartridge during securing of the cover in closed position. Thus, the rotation of the bolt 25 to tighten the same and draw down the cover in place on the casing not only serves to secure the cover in closed sealed position but seals the cartridge in position within the cup 40 in the casing and also spaces the cartridge from the side walls of the casing.

In use, oil enters the opening 20 and passes through the perforated side wall 31 of the cartridge radially inwardly thereof through the filtering material 36 of the cartridge and discharged out through the inner perforated side wall 32 of the cartridge into the space about the central outlet tube 16 where it will then enter suitable openings in this tube and flow downwardly and outwardly through the tube 16 and the outlet fitting 13. The space between the bottom of the cartridge and the rounded bottom wall 12, when the cartridge is assembled in the casing in its correct position therein, serves as a sediment basin for any settling out of sludge carried by the oil.

The foregoing description is directed soley towards the construction illustrated, but I desire it to be understood that I reserve the privilege of resorting to all the mechanical changes to which the device is susceptible, the invention being defined and limited only by the terms of the appended claims.

I claim:

1. An oil filter for use in the pressure lubricating system of an internal combustion engine comprising a casing having positioned centrally in its bottom an outlet opening adapted for connecting the casing in the flow line of such a lubricating system to discharge filtered oil thereto, and having an inlet opening in the side wall of the casing adapted for connecting the casing in the flow line of such a system having communication with the source of oil to be filtered, a removable filter cartridge mounted in said casing between said inlet and outlet openings, said cartridge being provided with inner and outer concentric cylindrical perforate side walls, said outer perforate side wall being spaced from the casing, and annular imperforate top and bottom walls having liquid-tight connection with said inner and outer cartridge side walls, said bottom wall having a central enlarged downwardly projecting hollow annular boss the bottom of which is set back axially inwardly of the cartridge and spaced from the plane of the bottom edge of the outer cylindrical wall, a central perforated tubular conduit fixed to the bottom wall of the casing and connected with the outlet opening thereof, said tube extending upwardly from the bottom of the casing through the cartridge whereby the perforated portion of the tube will lie in the space enclosed by the inner perforated side wall of the cartridge, a removable cover mounted on said casing to facilitate the assembly and replacement of said cartridge, means detachably securing said cover to the upper end of said tube, liquid-tight sealing means at the ends of the cartridge between said center tube and said inner perforate side wall of the cartridge, and a central upwardly open cup member around the lower end portion of said conduit fixedly secured to the bottom of the casing and extending upwardly therefrom in the casing cavity, said cup being of a size for receiving and fitting snugly over the outside of the annular boss on the bottom of the cartridge for holding the cartridge centralized in correct operating position within the casing, and spring means encircling the upper end of said center tube and acting between the cover and said upper sealing means for holding the filter cartridge securely seated in place on the cup member with the enlarged annular boss lodged within the cavity of the cup member when the cover is secured in normally closed position on the casing.

2. In a filter, the combination of a casing open at one end, a perforated center tube within said casing of a length to extend longitudinally through the filter cartridge when the same is mounted in place inside the casing, fluid outlet means in said casing communicating with said center tube, a cover for closing said open end of the casing, means cooperating with said cover and the upper end of said center tube to detachably fasten said cover to said casing, fluid inlet means in said casing, a removable filter cartridge unit surrounding said center tube and through which the tube extends, said cartridge comprising a cylindrical can container containing filtering material and having concentric inner and outer perforate cylindrical side walls, and upper and lower imperforate annular end walls having liquid-tight connection with said side walls, the lower wall of said cartridge being provided with a downwardly extending boss of considerably larger diameter than that of said center tube and containing a part of the filtering material disposed inside of the can between said inner and outer side walls thereof, a cup within said casing engaging and receiving said boss to support said cartridge, liquid sealing means at the opposite ends of said cartridge and disposed between the center tube and said inner perforate side wall of the cartridge, and spring means interposed between said cover and the top of said cartridge unit normally tending to urge the cartridge toward said cup and to maintain said boss held seated in place therein.

3. In a filter, the combination of a casing having an open top end and a bottom wall, a perforated center tube within and fixed at one end to said bottom wall of said casing, said tube being of a length to extend longitudinally through the filter cartridge when the cartridge is mounted in place within the casing, fluid inlet means to said casing, a removable filter cartridge unit surrounding said center tube and through which the tube extends, said cartridge comprising a cylindrical can container containing filtering material and having concentric inner and outer perforate cylindrical side walls, and upper and lower imperforate annular end walls having liquid-tight connection with the said side walls, the lower wall of said cartridge being provided with a downwardly extending boss of a diameter several times that of said center tube and containing a part of the filtering material disposed inside the can between the inner and outer side walls thereof, a cup within said casing and supported thereby, said cup engaging and receiving said boss to support said cartridge, a gasket at each end of said cartridge, one gasket being located in the cup and sealing the center tube from the inner cylindrical wall of the cartridge, and the other gasket sealing the upper end portion of said center tube and said inner cylindrical wall, the perforations in the tube being between the gaskets, and means interposed between said cover and the top of the cartridge for urging said cartridge unit toward said cup and holding said boss firmly seated therein.

4. In a filter, the combination of a casing having a bottom wall and an open top end, a cover for the open end of said casing, a perforated center tube within and secured at one end to said casing, said tube being of a length to extend longitudinally through the filter cartridge when the cartridge is mounted in place within the casing, a fluid outlet connection to the lower end of said tube, an annular cylindrical cartridge containing filtering material and being removably positionable into and from the casing through its open end, said cartridge surrounding the tube and spaced from both the tube and the casing thereby providing a central annular passageway between the cartridge and the casing, means on said center tube at each end of said cartridge sealing the upper and lower ends of said central passageway of the cartridge and forming a liquid-tight seal between said tube and the inner cylindrical said wall of the cartridge, fluid inlet means to said casing communicating with said outer passageway, a cup secured at one end to said bottom wall of the casing, and a central boss extending downwardly from the bottom of said cartridge in the normal operating position of the same and fitting into said cup recess, said boss containing filtering material and having its bottom wall set back axially inwardly of the cartridge and spaced from the plane of the bottom edge of the outer wall of the cartridge.

5. A filter cartridge unit comprising a can containing filtering material, said can having concentric inner and outer perforate cylindrical side walls and top and bottom annular imperforate end walls, said bottom wall being provided with a central enlarged outwardly projecting hollow annular boss the bottom wall of which is set back in an axial direction within the confines of the can as determined with reference to the plane of the bottom edge of said cylindrical outer wall of the can, said boss containing a part of the filtering material disposed inside of the can between said concentric side walls.

THOMAS E. ALDHAM.